(12) United States Patent
Konishi (10) Patent No.: US 10,324,269 B2
(45) Date of Patent: Jun. 18, 2019

(54) IMMERSION OBJECTIVE

(71) Applicant: OLYMPUS CORPORATION, Hachioji-shi, Tokyo (JP)

(72) Inventor: Hirokazu Konishi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 47 days.

(21) Appl. No.: 15/782,104

(22) Filed: Oct. 12, 2017

(65) Prior Publication Data

US 2018/0113279 A1  Apr. 26, 2018

(30) Foreign Application Priority Data

Oct. 20, 2016  (JP) .................................. 2016-206388

(51) Int. Cl.
*G02B 21/02*  (2006.01)
*G02B 9/12*  (2006.01)
*G02B 21/33*  (2006.01)

(52) U.S. Cl.
CPC .............. *G02B 9/12* (2013.01); *G02B 21/02* (2013.01); *G02B 21/33* (2013.01)

(58) Field of Classification Search
CPC ... G02B 9/12; G02B 9/34; G02B 9/60; G02B 9/62; G02B 9/64; G02B 12/00; G02B 21/02; G02B 21/33

(Continued)

(56) References Cited

U.S. PATENT DOCUMENTS

2002/0089760 A1* 7/2002 Yamaguchi ............ G02B 21/02 359/656
2002/0154414 A1* 10/2002 Matthae ................. G02B 21/02 359/656

(Continued)

FOREIGN PATENT DOCUMENTS

DE   102005027423 A1   12/2006
DE   102010014502 A1   10/2011

(Continued)

OTHER PUBLICATIONS

Extended European Search Report (EESR) dated Mar. 6, 2018 issued in a related European Application No. 17196544.5.

(Continued)

*Primary Examiner* — Darryl J Collins
(74) *Attorney, Agent, or Firm* — Holtz, Holtz & Volek PC (57) ABSTRACT

An immersion objective has a numerical aperture of 1.42 or higher, and includes in order from the object side a positive first lens group, a positive second lens group, and a negative third lens group. The first lens group includes a first cemented lens that includes a plano-convex lens and a first meniscus lens, and a positive lens. The second lens group includes a plurality of cemented lenses. The third lens group includes in order from the object side a second cemented lens that includes a positive lens and a negative lens, a negative lens that has a concave surface facing the object side, and a positive lens. When H is a maximum height of an axial marginal ray, f is a focal length of the objective, and $NA_{ob}$ is the numerical aperture, the objective satisfies a conditional expression below $$3.5 \leq (H/f) \times NA_{ob} \leq 5.2 \qquad (1).$$

20 Claims, 7 Drawing Sheets

(58) Field of Classification Search
USPC .................................... 359/368, 656–661
See application file for complete search history.

(56) References Cited

U.S. PATENT DOCUMENTS

| | | | |
|---|---|---|---|
| 2003/0043473 A1 | 3/2003 | Okuyama | |
| 2006/0082896 A1 | 4/2006 | Mandai et al. | |
| 2006/0203354 A1 | 9/2006 | Fujimoto et al. | |
| 2006/0279847 A1 | 12/2006 | Matthae et al. | |
| 2008/0149867 A1 | 6/2008 | Konishi et al. | |
| 2009/0032732 A1 | 2/2009 | Konishi et al. | |
| 2010/0202062 A1* | 8/2010 | Yoshida | G02B 21/33 359/661 |
| 2011/0043906 A1 | 2/2011 | Saito et al. | |
| 2013/0003187 A1 | 1/2013 | Wartmann | |
| 2013/0271829 A1* | 10/2013 | Kasahara | G02B 21/02 359/385 |
| 2013/0271847 A1* | 10/2013 | Shi | G02B 21/02 359/656 |
| 2016/0116724 A1 | 4/2016 | Abe | |

FOREIGN PATENT DOCUMENTS

| | | |
|---|---|---|
| JP | 2000035541 A | 2/2000 |
| JP | 2002341249 A | 11/2002 |
| JP | 2003015047 A | 1/2003 |
| JP | 2006113486 A | 4/2006 |
| JP | 2007121338 A | 5/2007 |
| JP | 2013033274 A | 2/2013 |
| JP | 2014048342 A | 3/2014 |
| JP | 2016085335 A | 5/2016 |

OTHER PUBLICATIONS

Related U.S. Appl. No. 15/784,725, filed Oct. 16, 2017, First Named Inventor: Kinechiro Abe, Title: Objective.

Office Action (Non-Final Rejection) dated May 2, 2019 issued in related U.S. Appl. No. 15/784,725.

* cited by examiner

FIG. 5A SPHERICAL ABERRATION NA 1.500

FIG. 5B AMOUNT OF VIOLATION OF SINE CONDITION NA 1.500

FIG. 5C ASTIGMATISM IMAGE HEIGHT 11 [mm]

FIG. 5D COMA

FIG. 6

IMMERSION OBJECTIVE

CROSS REFERENCE TO RELATED APPLICATIONS

This application is based upon and claims the benefit of priority from prior Japanese Patent Application No. 2016-206388, filed Oct. 20, 2016, the entire contents of which are incorporated herein by this reference.

BACKGROUND OF THE INVENTION

Field of the Invention

The present invention relates to an immersion objective and more particularly to an immersion objective that realizes an apochromat with a numerical aperture of 1.42 or higher.

Description of the Related Art

In recent years, observations of motility and activity inside a biological cell have been performed actively in the field of biology using total internal reflection fluorescence microscopy (hereinafter referred to as TIRFM). In the TIRFM, a microscope objective that has a high numerical aperture is used in order to totally reflect illumination light onto a boundary plane between a cover glass and a sample.

Conventional microscope objectives that have a high numerical aperture are disclosed in, for example, Japanese Laid-open Patent Publication No. 2013-033274 and Japanese Laid-open Patent Publication No. 2007-121338.

SUMMARY OF THE INVENTION

An immersion objective according to an aspect of the present invention has a numerical aperture of 1.42 or higher on an object side, and includes, in order from the object side: a first lens group that has a positive refractive power; a second lens group that has a positive refractive power; and a third lens group that has a negative refractive power. The first lens group includes a first cemented lens that includes a plano-convex lens and a first meniscus lens that has a concave surface facing the object side, and at least one positive lens. The second lens group includes a plurality of cemented lenses. The third lens group includes, in order from the object side, a second cemented lens that has a concave surface facing an image side and includes a positive lens and a negative lens, a negative lens that has a concave surface facing the object side, and a positive lens. When H is a maximum value of a height of an axial marginal ray in the immersion objective, f is a focal length of the immersion objective, and $NA_{ob}$ is a numerical aperture of the immersion objective, the immersion objective satisfies a conditional expression below $$3.5 \leq (H/f) \times NA_{ob} \leq 5.2 \qquad (1).$$

BRIEF DESCRIPTION OF THE DRAWINGS

The present invention will be more apparent from the following detailed description when the accompanying drawings are referenced.

DESCRIPTION OF THE EMBODIMENTS

As a method for realizing a high numerical aperture, there is a method that uses a special oil or cover glass. It is difficult to realize a high numerical aperture and to correct aberrations such as a spherical aberration and a chromatic aberration well without using a specific oil or cover glass as described above.

In light of the problem described above, embodiments of the present invention will now be described.

An objective according to an embodiment of the present invention is described. The objective according to the present embodiment (hereinafter simply referred to as an objective) is an infinity-corrected microscope objective used in combination with a tube lens, and is an immersion objective that is used in combination with an immersion liquid when observation is performed and that has a numerical aperture of 1.42 or higher on the object side. The immersion liquid to be used is a medium that has a refractive index close to the refractive index inside a sample, and is, for example, water or oil.

The objective includes, in order from the object side, a first lens group that has a positive refractive power, a second lens group that has a positive refractive power, and a third lens group that has a negative refractive power.

The first lens group includes a first cemented lens and at least one positive lens. The first cemented lens that is a lens component arranged closest to the object side. The first cemented lens includes a plano-convex lens that has a flat surface facing the object side, and a first meniscus lens that is arranged at the position closer to the image side than the plano-convex lens and has a concave surface facing the object side. In other words, the plano-convex lens is a lens arranged closest to the object side among the lenses that configure the objective. The flat surface of the plano-convex lens is a first surface of the objective that has contact with an immersion liquid.

It is preferable that the first lens group include the first cemented lens and one positive lens or include the first cemented lens and two positive lenses. Further, it is preferable that the two positive lenses are both a single lens.

It is preferable that a convex surface that is a lens surface at the image side of the first cemented lens be a spherical surface that is equivalent to, or slightly greater than, that of a spherical crown (or a spherical surface portion) of a hemisphere. As a result, the curvature of the convex surface at the image side of the first cemented lens satisfies an aplanatic condition, so as to suppress the occurrence of a spherical aberration and a coma. This results in being able to realize a higher numerical aperture. Further, the first cemented lens has a joint surface that is a concave surface facing the object side, which results in correcting the Petzval sum due to a negative refractive power of the joint surface.

The first lens group is configured to reduce the divergence of a pencil of light with its positive refractive power so as to lead a divergence-reduced pencil of light to the second lens group. At least one positive lens included in the first lens group is effective in suppressing the divergence of the pencil of light led to the second lens group. Preferably, each of the at least one positive lens is a single lens, and more preferably, is a meniscus lens having a concave surface facing the object side.

The second lens group includes a plurality of cemented lenses. A spherical aberration and a chromatic aberration are corrected by the plurality of cemented lenses included in the second lens group. It is preferable that the second lens group include three-piece cemented lens in order to realize an objective which has a high numerical aperture and is an apochromat.

The third lens group includes, in order from the object side, a second cemented lens that has a concave surface facing the image side, a negative lens that has a concave surface facing the object side, and a positive lens that has a convex surface facing the image side. The second cemented lens is a cemented lens that includes a positive lens and a negative lens arranged at the position closer to the image side than the positive lens. The negative lens and the positive lens which are arranged at the position closer to the image side than the second cemented lens may be cemented, or each may be configured as a single lens. In other words, the third lens group may include the second cemented lens that has a concave surface facing the image side, and a cemented lens having a meniscus shape that has a concave surface facing the object side. Further, the third lens group may include the second cemented lens, a negative lens that is a single lens that has a concave surface facing the object side, and a positive lens that is a single lens that has a convex surface facing the image side.

The second cemented lens included in the third lens group has a strong negative refractive power. This results in correcting the Petzval sum and correcting a spherical aberration and a coma well. In order to correct a chromatic aberration well, it is preferable that the second cemented lens be a cemented lens in which a positive lens and a negative lens are joined.

In the negative lens which is included in the third lens group and which has a concave surface facing the object side, due to the negative refractive power of the concave surface facing the object side, the Petzval sum is corrected well and aberrations are also corrected well. Further, in the negative lens which is included in the third lens group and which has a concave surface facing the object side, and in the positive lens which is included in the third lens group and which has a convex surface facing the image side, the height and the angle of a light ray are adjusted when the light ray is emitted from the objective. The negative lens which has a concave surface facing the object side and the positive lens which has a convex surface facing the image side are meniscus lenses that each have a concave lens facing the object side, and it is preferable that they be configured to be cemented as a cemented lens. This configuration results in correcting a lateral chromatic aberration.

As used herein, the pencil of light is a bundle of light rays emitted from a point on an object (an object point). Further, the lens component is a lens block in which only two surfaces that are a surface at the object side and a surface at the image side among lens surfaces through which a light ray from an object point passes have contact with air (or an immersion liquid), regardless of whether it is a single lens or a cemented lens.

The objective is configured to satisfy Conditional Expression (1) below.

$$3.5 \leq (H/f) \times NA_{ob} \leq 5.2 \qquad (1)$$

Here, H is a maximum value of the height of an axial marginal ray in the objective. f is a focal length of the objective. $NA_{ob}$ is a numerical aperture on the object side of the objective. The axial marginal ray is a light ray that is included in a divergent pencil of light from an object point on an optical axis and that passes through a position farthest away from the optical axis in (that is, an outermost position of) an exit pupil of the objective.

Conditional Expression (1) is a conditional expression for observing a wide range from the center of a sample to around the sample with a sufficient resolution and a bright and high contrast while realizing a high numerical aperture. It is possible to prevent the height of a marginal ray from becoming too great by preventing $(H/f) \times NA_{ob}$ from exceeding the upper limit. Thus, it is possible to correct aberrations such as a spherical aberration and a coma well by reducing the occurrence of the aberrations. Further, it is possible to maintain a sufficient height of the marginal ray in the second lens group by preventing $(H/f) \times NA_{ob}$ from falling below the lower limit, and this results in being able to make the height of the marginal ray in the third lens group relatively small. Thus, it is possible to correct a field curvature to a substantially preferable extent.

According to the objective having the configuration described above, it is possible to realize an objective that has a high numerical aperture of 1.42 or higher and that is an apochromat.

A more preferable configuration of the objective is described below.

It is preferable that the objective be configured to satisfy Conditional Expression (2) to Conditional Expression (5) below.

$$1.8 \leq ((H-L)/f) \times NA_{ob} \leq 3.2 \qquad (2)$$

$$1 \leq (f_1/f) \times NA_{ob} \leq 1.4 \qquad (3)$$

$$1.75 \leq n_1 \leq 1.9 \qquad (4)$$

$$9 \leq f_p/f \leq 17 \qquad (5)$$

Here, L is a minimum value of the height of an axial marginal ray in the third lens group. $f_1$ is a focal length of the first cemented lens. $n_1$ is a refractive index of the first meniscus lens. $f_p$ is a parfocalizing distance of the objective. The parfocalizing distance is a length between a plane in which the objective is mounted on a microscope and a front focal position of the objective.

Conditional Expression (2) is a conditional expression that makes an effect provided by Conditional Expression (1) more effective and defines an increase and decrease in the height of the marginal ray for a field curvature correction. It is possible to make the height of the marginal ray in the third lens group sufficiently small by preventing $((H-L)/f) \times NA_{ob}$ from exceeding the upper limit. Thus, it is possible to correct the Petzval sum in the third lens group effectively, which results in being able to correct a field curvature well in a wide field. It is possible to prevent the height of the marginal ray in the third lens group from becoming too small by preventing $((H-L)/f) \times NA_{ob}$ from falling below the lower limit. Thus, it is possible to prevent the third lens group from becoming too large. This results in adequately suppressing the divergence of a pencil of light near an edge of the objective, so there is no need for a very strong positive refractive power when the pencil of light is converted into a collimated beam at the edge of the objective. Thus, it is possible to reduce a coma that occurs when a pencil of light is converted into a collimated beam.

Conditional Expression (3) is a conditional expression that corrects a high-order aberration that occurs in a front lens and the Petzval sum in a balanced manner. It is possible to prevent the refractive power of the first cemented lens that is a front lens from becoming too weak by preventing $(f_1/f) \times NA_{ob}$ from exceeding the upper limit, which results in being able to sufficiently reduce the divergence of a pencil of light emitted from the first cemented lens. Thus, it is possible to prevent the height of a light ray from becoming too great when the light ray enters subsequent portions in the optical system. This results in also being able to correct a spherical aberration or an off-axis aberration well in an objective with a high NA of 1.42 or higher. Further, it is possible to prevent the refractive power of the first cemented lens from becoming too strong by preventing $(f_1/f) \times NA_{ob}$ from falling below the lower limit. This results in being able to prevent the height of the light ray from becoming too small in the subsequent portions in the optical system, and in being able to increase and decrease the height of the light ray in order to correct a field curvature in the subsequent portions in the optical system, particularly in the second and subsequent lens groups. Thus, it is possible to better correct a field curvature.

Conditional Expression (4) is a conditional expression that sufficiently refracts a light ray having a large divergence angle while suppressing the occurrence of an aberration in the first lens group. A light ray having a large divergence angle that enters the first meniscus lens can be sufficiently refracted by satisfying Conditional Expression (4), so it is possible to decrease, in the second and subsequent lens groups, the height of a light ray that passes through these lens groups. This results in being able to suppress the occurrence of a high-order spherical aberration and a high-order coma while suppressing the occurrence of a chromatic aberration in the entire optical system as much as possible. In general, a glass material having a high refractive index has a high dispersivity (small Abbe number). In view of this, it is possible to prevent the Abbe number from becoming too small by preventing $n_1$ from exceeding the upper limit, which results in being able to suppress the occurrence of an axial chromatic aberration and a lateral chromatic aberration in a front lens. Further, it is possible to suppress the occurrence of a high-order spherical aberration and a high-order coma in the entire optical system by preventing $n_1$ from falling below the lower limit.

Conditional Expression (5) is a conditional expression that ensures a wide field while maintaining a predetermined parfocalizing distance. It is possible to prevent a focal length of the objective from becoming too short while ensuring that a parfocalizing distance of the objective does not exceed a predetermined length, by preventing L/f from exceeding the upper limit. This results in being able to prevent the magnification of a microscope optical system from becoming too high, the microscope optical system being a combination of the objective and a tube lens that has a predetermined focal length. Thus, it is possible to perform an observation in a wide field. It is possible to prevent the magnification of the microscope optical system from becoming too low by preventing L/f from falling below the lower limit. This results in being able to perform a high-definition observation.

It is preferable that the objective have a first negative lens and be configured to satisfy Conditional Expression (6) below.

$$0.005 \le d/h_1 \le 0.1 \quad (6)$$

Here, d is a thickness of the first negative lens on the optical axis. $h_1$ is the height of an axial marginal ray on a lens surface on the object side of the first negative lens.

Conditional Expression (6) is a conditional expression that better corrects a high-order aberration. When Conditional Expression (6) is satisfied, a margin is created in a limited space in the objective that is restricted by a predetermined parfocalizing distance. Thus, it is possible to increase a refractive power that occurs on each lens surface by adjusting a lens spacing or to increase the number of lenses, which results in being able to better correct a high-order aberration. It is possible to prevent the first negative lens from becoming too thick by preventing $d/h_1$ from exceeding the upper limit. This results in there occurring a margin in a space, so it is possible to better correct a high-order aberration. Further, it is possible to prevent the first negative lens from becoming too thin by preventing $d/h_1$ from falling below the lower limit. Thus, it is possible to prevent the occurrence of an aberration due to a stress being applied to a lens when the lens is attached to a lens frame or when the lens is assembled.

The objective may be configured to satisfy Conditional Expression (1-1) to Conditional Expression (5-1) below instead of Conditional Expression (1) to Conditional Expression (5).

$$3.8 \le (H/f) \times NA_{ob} \le 4.8 \quad (1\text{-}1)$$

$$2.4 \le ((H-L)/f) \times NA_{ob} \le 3.0 \quad (2\text{-}1)$$

$$1.03 \le (f_1/f) \times NA_{ob} \le 1.2 \quad (3\text{-}1)$$

$$1.8 \le n_1 \le 1.89 \quad (4\text{-}1)$$

$$10 \le f_p/f \le 16 \quad (5\text{-}1)$$

Embodiments of the objective described above are described below.

First Embodiment

Figure 1:
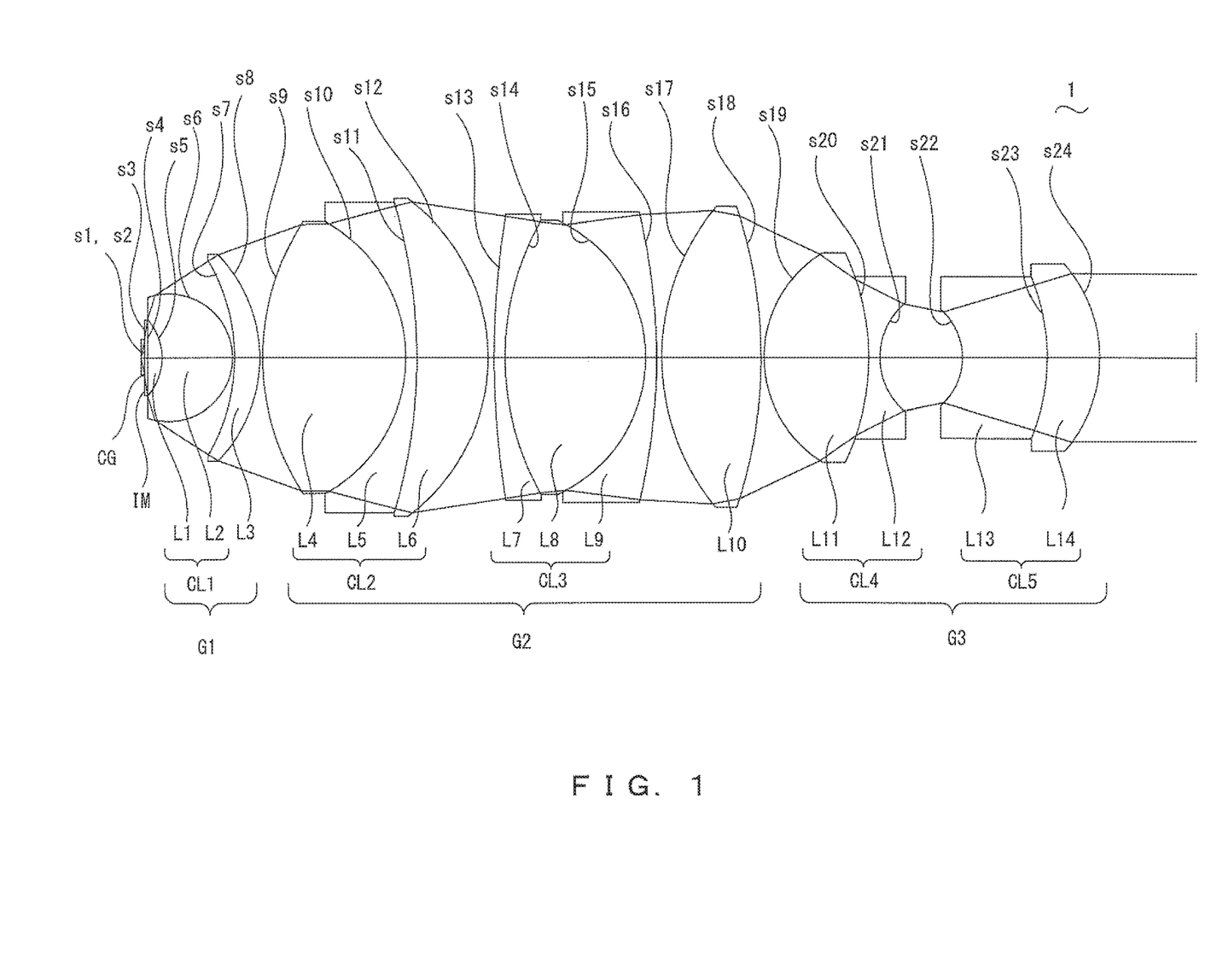
FIG. 1 is a cross-sectional view of an objective 1 according to a first embodiment.

FIG. 1 is a cross-sectional view of an objective 1 according to the present embodiment. The objective 1 is a microscope immersion objective that includes, in order from the object side, a first lens group G1 that has a positive refractive power, a second lens group G2 that has a positive refractive power, and a third lens group G3 that has a negative refractive power.

The first lens group G1 includes, in order from the object side, a cemented lens CL1 (first cemented lens) and a meniscus lens L3 that has a concave surface facing the object side. The cemented lens CL1 includes a plano-convex lens L1 that is arranged closest to the object side and has a flat surface facing the object side, and a meniscus lens L2 (first meniscus lens) that is arranged at the position closer to the image side than the plano-convex lens L1 and has a concave surface facing the object side. The meniscus lens L3 is a positive lens.

The second lens group G2 includes a plurality of cemented lenses (a cemented lens CL2 and a cemented lens CL3). Specifically, the second lens group G2 includes, in order from the object side, the cemented lens CL2, the cemented lens CL3, and a biconvex lens L10.

The cemented lens CL2 is a first achromatic lens component that includes three-piece cemented lens composed of positive lens, negative lens, and positive lens included in this order. The cemented lens CL2 includes a biconvex lens L4, a meniscus lens L5 that has a concave surface facing the object side, and a meniscus lens L6 that has a concave surface facing the object side.

The cemented lens CL3 is a second achromatic lens component that includes three-piece cemented lens composed of negative lens, positive lens, and negative lens included in this order. The cemented lens CL3 includes a meniscus lens L7 that has a concave surface facing the image side, a biconvex lens L8, and a meniscus lens L9 that has a concave surface facing the object side. The cemented lens CL3 is arranged near the cemented lens CL2. Specifically, the cemented lens CL3 is arranged at a position in which the distance on an optical axis between a lens surface s12 that is a lens surface of the cemented lens CL2 and a lens surface s13 that is a lens surface of the cemented lens CL3 is less than the thickness of the cemented lens CL3 on the optical axis. The lens surface s12 is situated closest to the image side among the lens surfaces of the cemented lens CL2. The lens surface s13 is situated closest to the object side among the lens surfaces of the cemented lens CL3.

The third lens group G3 includes, in order from the object side, a cemented lens CL4 (second cemented lens) that has a concave surface facing the image side, and a cemented lens CL5 that has a concave surface facing the object side. The cemented lens CL4 has a meniscus shape that has a concave surface facing the image side, and includes, in order from the object side, a biconvex lens L11 that is a positive lens and a biconcave lens L12 that is a negative lens. The cemented lens CL5 has a meniscus shape that has a concave surface facing the object side, and includes, in order from the object side, a meniscus lens L13 that has a concave surface facing the object side and a meniscus lens L14 that has a concave surface facing the object side.

In the objective 1, the meniscus lens L5, the meniscus lens L7, and the meniscus lens L9 satisfy Conditional Expression (6). In other words, each of the meniscus lens L5, the meniscus lens L7, and the meniscus lens L9 is a first negative lens of the objective 1.

The following is lens data of the objective 1. INF in the lens data represents infinity ($\infty$).

Objective 1

| s | r | d | nd | vd |
|---|---|---|---|---|
| 1 | INF | 0 | | |
| 2 | INF | 0.17 | 1.52397 | 54.41 |
| 3 | INF | 0.152 | 1.51495 | 41 |
| 4 | INF | 0.756 | 1.51633 | 64.14 |
| 5 | −3.0323 | 3.649 | 1.883 | 40.76 |
| 6 | −3.3067 | 0.1 | | |
| 7 | −10 | 1.306 | 1.883 | 40.76 |
| 8 | −7.6719 | 0.15 | | |
| 9 | 13.0236 | 7.376 | 1.43875 | 94.93 |
| 10 | −8.042 | 0.573 | 1.738 | 32.26 |
| 11 | −28.0828 | 3.659 | 1.43875 | 94.93 |
| 12 | −10.2544 | 0.311 | | |
| 13 | 45.4925 | 0.565 | 1.63775 | 42.41 |
| 14 | 14.4615 | 7.275 | 1.43875 | 94.93 |
| 15 | −7.8092 | 0.564 | 1.63775 | 42.41 |
| 16 | −32.0204 | 0.25 | | |
| 17 | 12.2183 | 5.141 | 1.43875 | 94.93 |
| 18 | −24.5259 | 0.15 | | |
| 19 | 6.3796 | 5.386 | 1.43875 | 94.93 |
| 20 | −12.7768 | 0.578 | 1.63775 | 42.41 |
| 21 | 3.7146 | 4.272 | | |
| 22 | −3.3463 | 4.361 | 1.7725 | 49.6 |
| 23 | −11.08 | 2.719 | 1.7847 | 26.29 |
| 24 | −7.3475 | | | | s represents a surface number, r represents a radius of curvature (mm), d represents a surface interval (mm), nd represents a refractive index with respect to a d line, and vd represents an Abbe number. These symbols are also used in embodiments described subsequently. Surface numbers s1 and s2 represent an object surface and a surface at the object side of a cover glass CG. Surfaces represented by surface numbers s3, s4, and s24 are a surface at the image side of the cover glass CG, a lens surface of the objective 1 that is situated closest to the object side, and a lens surface of the objective 1 that is situated closest to the image side, respectively. A refractive index nd3 represents a refractive index of an immersion liquid IM. Further, for example, a surface interval d1 represents a distance on the optical axis between the surface represented by the surface number s1 and the surface represented by the surface number s2.

The following is various data of the objective 1. $f_{G1}$, $f_{G2}$, and $f_{G3}$ are a focal length of the first lens group G1, a focal length of the second lens group G2, and a focal length of the third lens group G3, respectively. $\beta$ is a magnification of the objective, FN is a field number, and WD is a working distance. The other parameters are as described above.

$\beta=60$, FN=22, WD=0.152 mm, H=8.072 mm, f=3 mm, $NA_{ob}=1.5$, L=2.363 mm, $f_1=4.7916$ mm, $n_1=1.833$, $f_p=45$ mm, $f_{G1}=4.29$ mm, $f_{G2}=15.05$ mm, $f_{G3}=-15.1443$ mm When the meniscus lens L5 is the first negative lens, d and $h_1$ are as follows.

d=0.573 mm, $h_1=16.0312$ mm

When the meniscus lens L7 is the first negative lens, d and $h_1$ are as follows.

d=0.565 mm, $h_1=15.014$ mm

When the meniscus lens L9 is the first negative lens, d and $h_1$ are as follows.

d=0.564 mm, $h_1=15.342$ mm

The objective 1 satisfies Conditional Expression (1) to Conditional Expression (6) as described below.

$$(H/f) \times NA_{ob} = 4.036 \quad (1)$$

$$((H-L)/f) \times NA_{ob} = 2.8545 \quad (2)$$

$$(f_1/f) \times NA_{ob} = 1.0648 \quad (3)$$

$$n_1 = 1.833 \quad (4)$$

$$f_p/f = 15 \quad (5)$$

$$d/h_1 = 0.03574 \text{ (in the case of the meniscus lens } L5) \quad (6)$$

$$d/h_1 = 0.03763 \text{ (in the case of the meniscus lens } L7) \quad (6)$$

$$d/h_1 = 0.03676 \text{ (in the case of the meniscus lens } L9) \quad (6)$$

Figure 2:
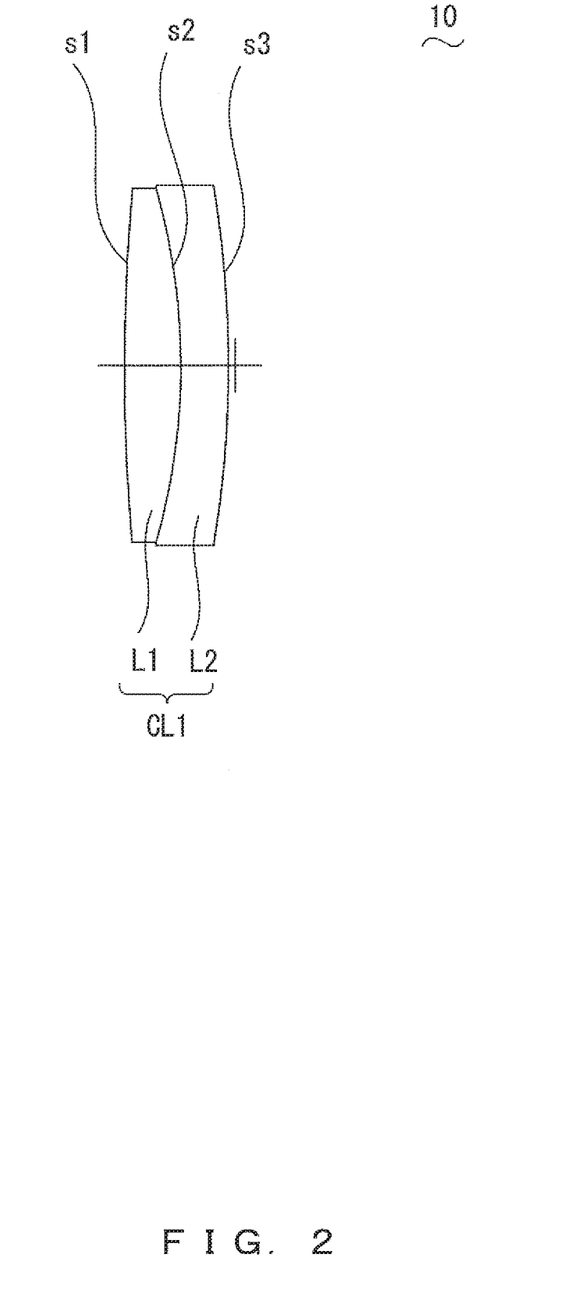
FIG. 2 is a cross-sectional view of a tube lens 10.

FIG. 2 is a cross-sectional view of a tube lens 10 used in combination with the objective 1. The tube lens 10 is a microscope tube lens that forms a magnified image of an object in combination with an infinity-corrected objective. The tube lens 10 is a cemented lens CL1 that includes a biconvex lens L1 and a meniscus lens L2 that is arranged at the position closer to image side than the biconvex lens. The meniscus lens L2 has a concave surface facing the object side. The tube lens 10 is arranged such that the distance on an optical axis between the lens surface s24 that is a lens surface of the objective 1 and a lens surface s1 that is a lens surface of the tube lens 10 is 133 mm. The lens surface s24 is situated closest to the image side among the lens surfaces of the objective 1. The lens surface s1 is situated closest to the object side among the lens surfaces of the tube lens 10. The focal length of the tube lens 10 is 180 mm.

The following is lens data of the tube lens 10.

| Tube lens 10 | | | | |
|---|---|---|---|---|
| s | r | d | nd | vd |
| 1 | 193.123 | 5.5 | 1.48749 | 70.23 |
| 2 | −61.238 | 4.6 | 1.72047 | 34.71 |
| 3 | −105.391 | | | |

Figure 3A:
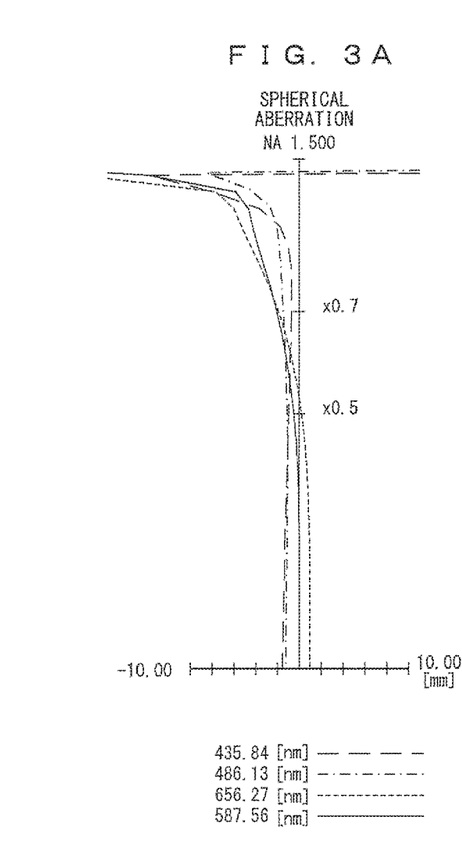
FIGS. 3A to 3D are diagrams of an aberration in an optical system that includes the objective 1 and the tube lens 10.
Figure 3B:
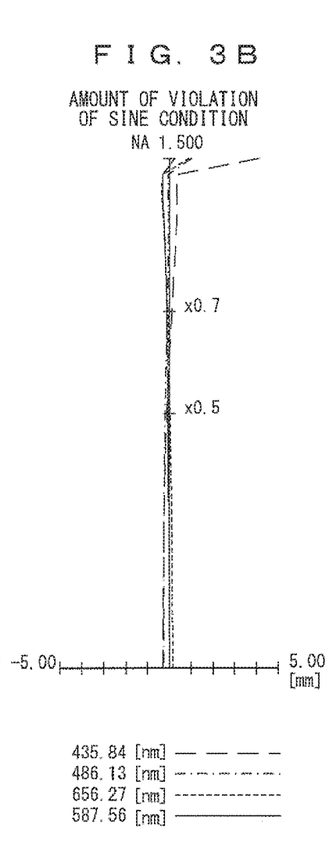
Figure 3C:
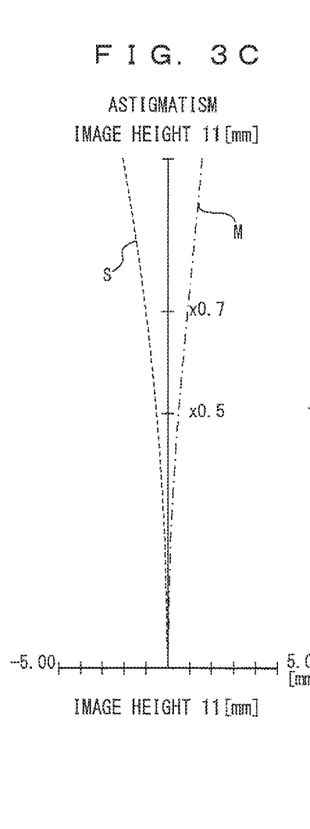
Figure 3D:
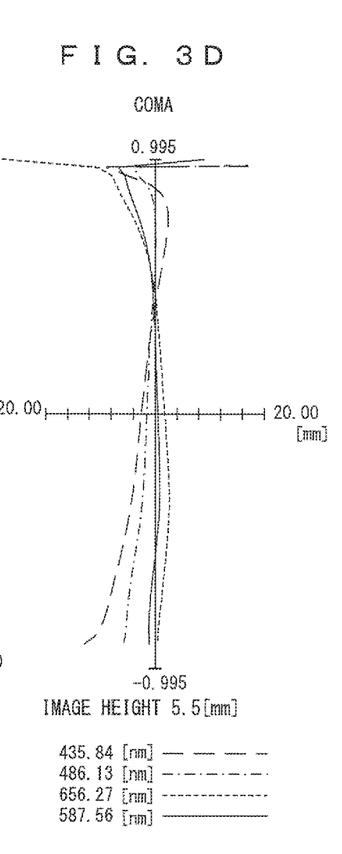

FIGS. 3A to 3D are diagrams of an aberration in an optical system that includes the objective 1 and the tube lens 10. These diagrams illustrate aberrations in an image plane formed by the objective 1 and the tube lens 10. FIG. 3A is a spherical aberration diagram, FIG. 3B illustrates an amount of violation of the sine condition, FIG. 3C is an astigmatism diagram, and FIG. 3D is a coma diagram. In the figures, "M" represents a meridional component, and "S" represents a sagittal component. As illustrated in FIGS. 3A to 3D, the aberrations are corrected well in a wide field in the present embodiment.

Second Embodiment

Figure 4:
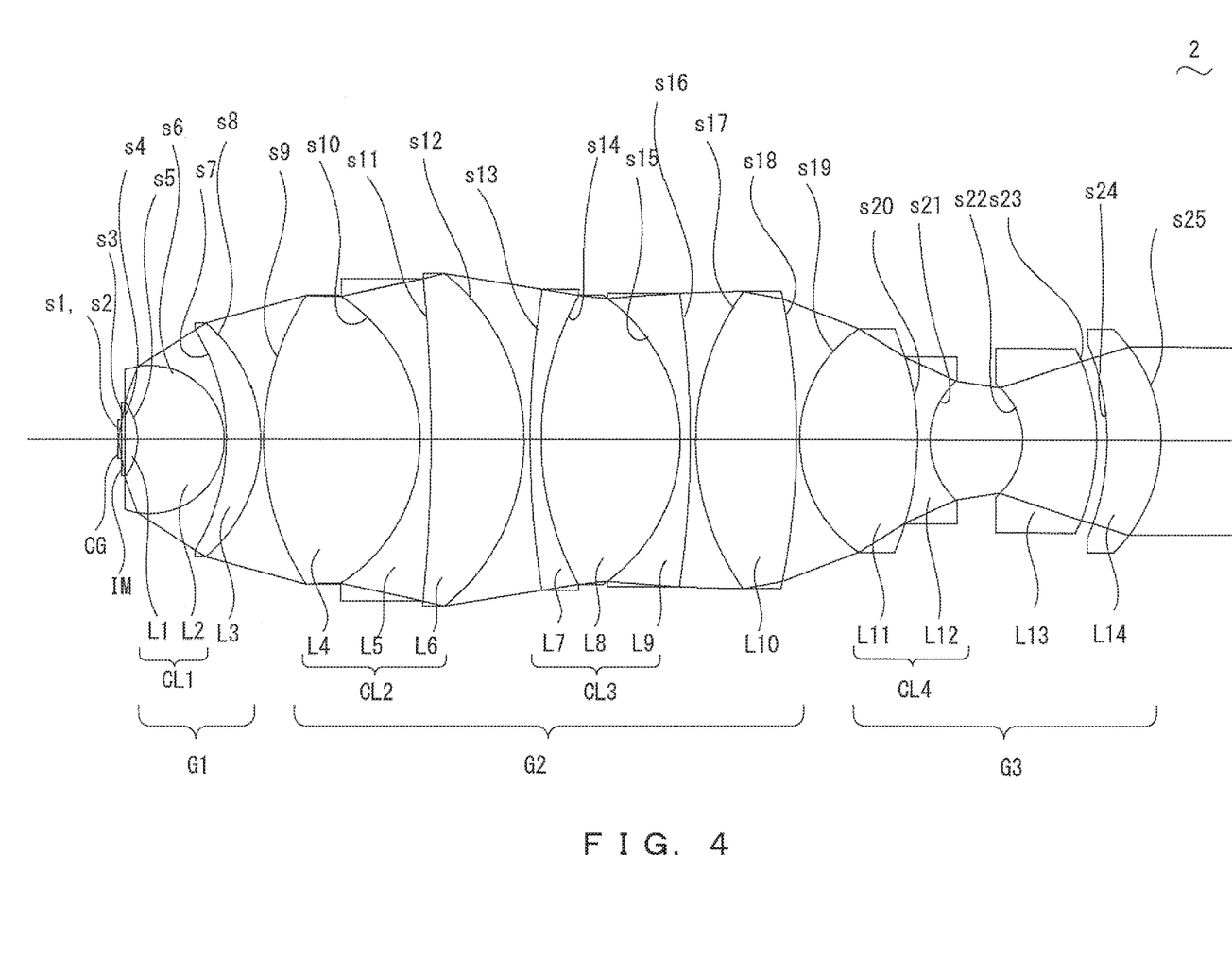
FIG. 4 is a cross-sectional view of an objective 2 according to a second embodiment.

FIG. 4 is a cross-sectional view of an objective 2 according to the present embodiment. The objective 2 is a microscope immersion objective that includes, in order from the object side, a first lens group G1 that has a positive refractive power, a second lens group G2 that has a positive refractive power, and a third lens group G3 that has a negative refractive power.

The first lens group G1 includes, in order from the object side, a cemented lens CL1 (first cemented lens) and a meniscus lens L3 that has a concave surface facing the object side. The cemented lens CL1 includes a plano-convex lens L1 that is arranged closest to the object side and has a flat surface facing the object side, and a meniscus lens L2 (first meniscus lens) that is arranged at the position closer to image side than the plano-convex lens L1 and has a concave surface facing the object side. The meniscus lens L3 is a positive lens.

The second lens group G2 includes a plurality of cemented lenses (a cemented lens CL2 and a cemented lens CL3). Specifically, the second lens group G2 includes, in order from the object side, the cemented lens CL2, the cemented lens CL3, and a biconvex lens L10.

The cemented lens CL2 is a first achromatic lens component that includes three-piece cemented lens composed of positive lens, negative lens, and positive lens included in this order. The cemented lens CL2 includes a biconvex lens L4, a meniscus lens L5 that has a concave surface facing the object side, and a meniscus lens L6 that has a concave surface facing the object side.

The cemented lens CL3 is a second achromatic lens component that includes three-piece cemented lens composed of negative lens, positive lens, and negative lens included in this order. The cemented lens CL3 includes a meniscus lens L7 that has a concave surface facing the image side, a biconvex lens L8, and a meniscus lens L9 that has a concave surface facing the object side. The cemented lens CL3 is arranged near the cemented lens CL2, specifically, at a position in which the distance on an optical axis between a lens surface s12 that is a lens surface of the cemented lens CL2 and a lens surface s13 that is a lens surface of the cemented lens CL3 is less than the thickness of the cemented lens CL3 on the optical axis. The lens surface s12 is situated closest to the image side among the lens surfaces of the cemented lens CL2. The lens surface s13 is situated closest to the object side among the lens surfaces of the cemented lens CL3.

The third lens group G3 includes, in order from the object side, a cemented lens CL4 (second cemented lens) that has a concave surface facing the image side, a meniscus lens L13 that has a concave surface facing the object side, and a meniscus lens L14 that has a concave surface facing the object side. The cemented lens CL4 has a meniscus shape that has a concave surface facing the image side, and includes, in order from the object side, a biconvex lens L11 that is a positive lens and a biconcave lens L12 that is a negative lens.

In the objective 2, the meniscus lens L5, the meniscus lens L7, and the meniscus lens L9 satisfy Conditional Expression (6). In other words, each of the meniscus lens L5, the meniscus lens L7, and the meniscus lens L9 is a first negative lens of the objective 2.

The following is lens data of the objective 2.

| Objective 2 | | | | |
|---|---|---|---|---|
| s | r | d | nd | vd |
| 1 | INF | 0 | | |
| 2 | INF | 0.17 | 1.52397 | 54.41 |
| 3 | INF | 0.143 | 1.51495 | 41 |
| 4 | INF | 0.6 | 1.51633 | 64.14 |
| 5 | −2.9657 | 4.088 | 1.883 | 40.76 |
| 6 | −3.4989 | 0.1 | | |
| 7 | −10 | 1.597 | 1.883 | 40.76 |
| 8 | −7.2578 | 0.15 | | |
| 9 | 12.6465 | 7.37 | 1.43875 | 94.93 |
| 10 | −8.042 | 0.523 | 1.738 | 32.26 |
| 11 | −75.5769 | 4.357 | 1.43875 | 94.93 |
| 12 | −10.1926 | 0.283 | | |
| 13 | 45.2348 | 0.523 | 1.63775 | 42.41 |
| 14 | 14.1108 | 6.542 | 1.43875 | 94.93 |
| 15 | −8.2794 | 0.475 | 1.63775 | 42.41 |
| 16 | −48.0863 | 0.25 | | |
| 17 | 12.1423 | 4.759 | 1.43875 | 94.93 |
| 18 | −34.4139 | 0.15 | | |
| 19 | 6.4418 | 5.523 | 1.43875 | 94.93 |
| 20 | −13.6512 | 0.597 | 1.63775 | 42.41 |
| 21 | 3.8526 | 4.37 | | |
| 22 | −3.4655 | 3.461 | 1.7725 | 49.6 |
| 23 | −10.3549 | 0.5 | | |
| 24 | −12 | 2.536 | 1.80518 | 25.42 |
| 25 | −7.3961 | | | |

Surfaces represented by surface numbers s4 and s25 are a lens surface of the objective 2 that is situated closest to the object side and a lens surface of the objective 2 that is situated closest to the image side, respectively.

The following is various data of the objective 2.

$\beta$=60, FN=22, WD=0.143 mm, H=7.973 mm, f=3 mm, $NA_{ob}$=1.5, L=2.519 mm, $f_1$=5.0898 mm, $n_1$=1.833, $f_p$=45 mm, $f_{G1}$=4.36 mm, $f_{F2}$=16.46 mm, $f_{G3}$=−17.54 mm When the meniscus lens L5 is the first negative lens, d and $h_1$ are as follows.

d=0.523 mm, $h_1$=16.472 mm

When the meniscus lens L7 is the first negative lens, d and $h_1$ are as follows.

d=0.523 mm, $h_1$=14.824 mm

When the meniscus lens L9 is the first negative lens, d and $h_1$ are as follows.

d=0.475 mm, $h_1$=14.674 mm

The objective 2 satisfies Conditional Expression (1) to Conditional Expression (6) as described below.

$(H/f) \times NA_{ob} = 3.9865$          (1)

$((H-L)/f) \times NA_{ob} = 2.727$          (2)

$(f_1/f) \times NA_{ob} = 1.131066667$          (3)

$n_1 = 1.833$          (4)

$f_p/f = 15$          (5)

$d/h_1 = 0.03175$ (in the case of the meniscus lens L5)          (6)

$d/h_1 = 0.03528$ (in the case of the meniscus lens L7)          (6)

$d/h_1 = 0.03237$ (in the case of the meniscus lens L9)          (6)

Figure 5A:
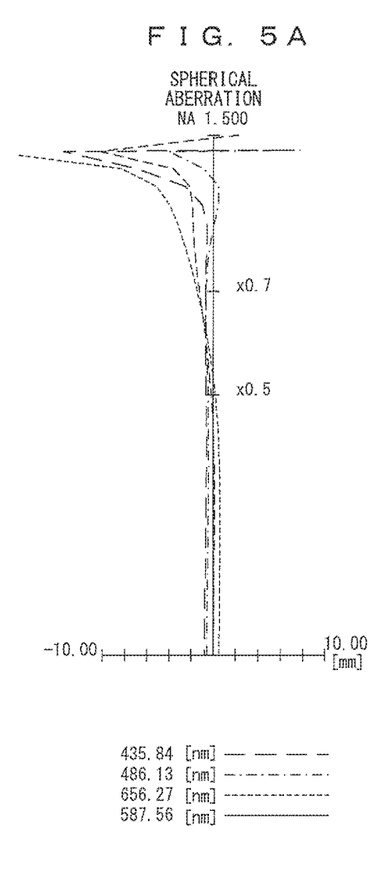
FIGS. 5A to 5D are diagrams of an aberration in an optical system that includes the objective 2 and the tube lens 10.
Figure 5B:
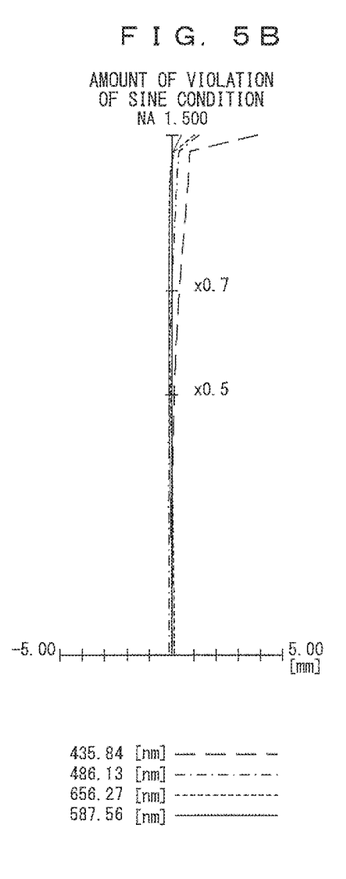
Figure 5C:
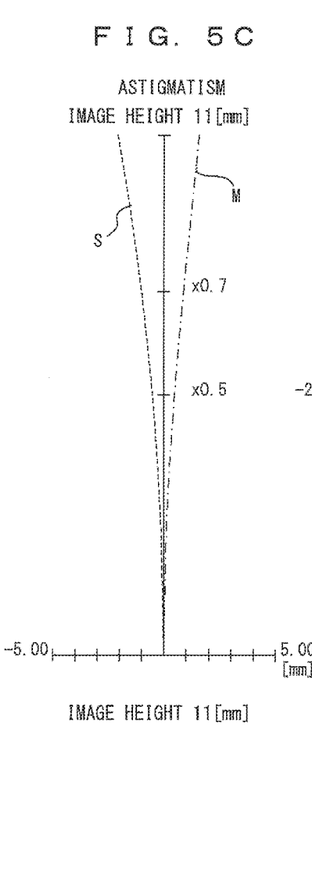
Figure 5D:
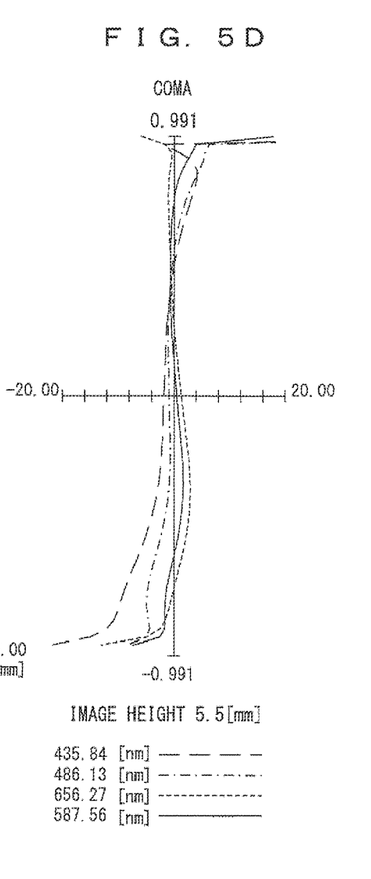

FIGS. 5A to 5D are diagrams of an aberration in an optical system that includes the objective 2 and the tube lens 10. These diagrams illustrate aberrations in an image plane formed by the objective 2 and the tube lens 10. The tube lens 10 is arranged such that the distance on an optical axis between the lens surface s25 that is a lens surface of the objective 2 and the lens surface s1 that is a lens surface of the tube lens 10 is 133 mm. The lens surface s25 is situated closest to the image side among lens surfaces of the objective 2. The lens surface s1 is situated closest to the object side among lens surfaces of the tube lens 10. FIG. 5A is a spherical aberration diagram, FIG. 5B illustrates an amount of violation of the sine condition, FIG. 5C is an astigmatism diagram, and FIG. 5D is a coma diagram. As illustrated in FIGS. 5A to 5D, the aberrations are corrected well in a wide field in the present embodiment.

Third Embodiment

Figure 6:
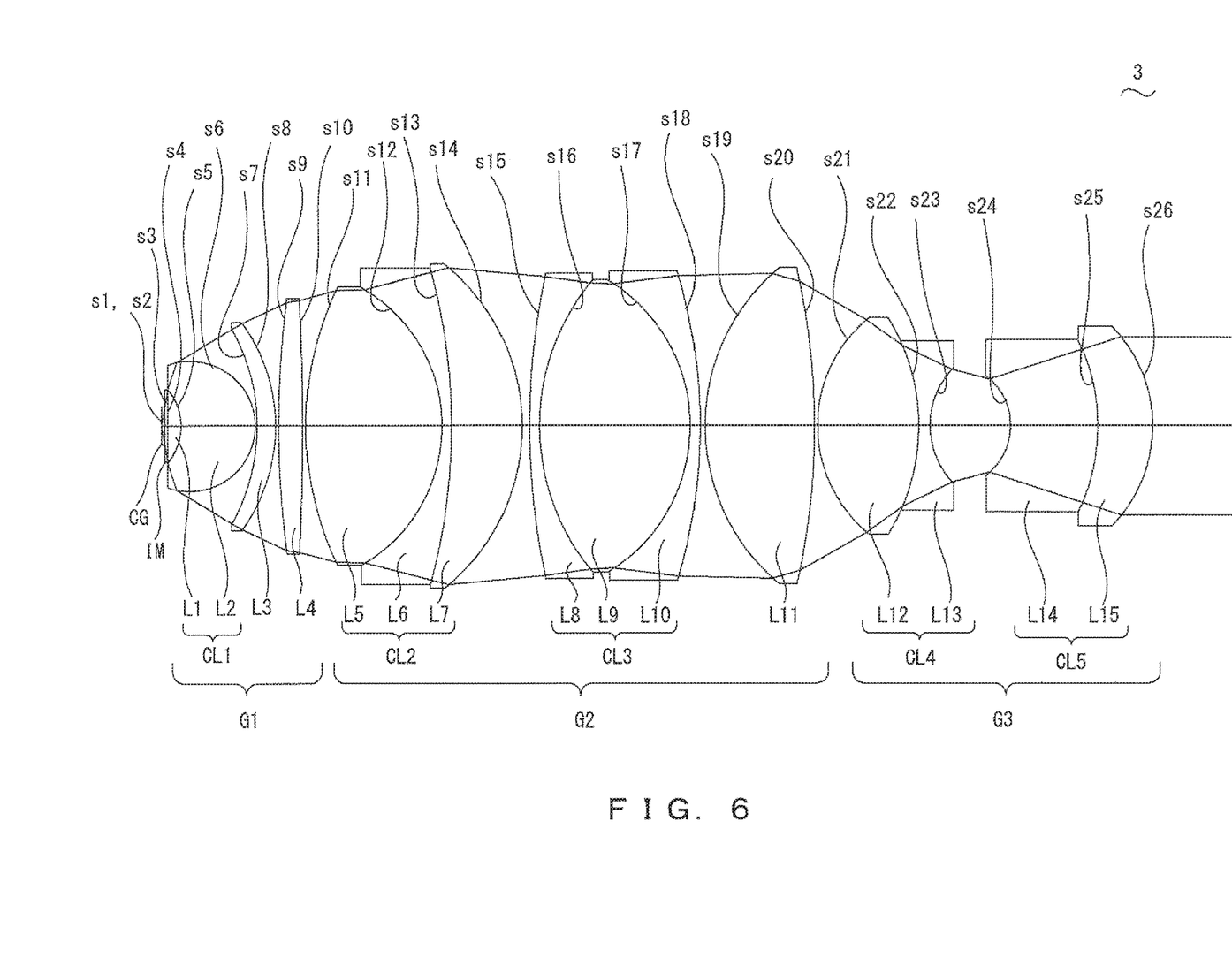
FIG. 6 is a cross-sectional view of an objective 3 according to a third embodiment.

FIG. 6 is a cross-sectional view of an objective 3 according to the present embodiment. The objective 3 is a microscope immersion objective that includes, in order from the object side, a first lens group G1 that has a positive refractive power, a second lens group G2 that has a positive refractive power, and a third lens group G3 that has a negative refractive power.

The first lens group G1 includes, in order from the object side, a cemented lens CL1 (first cemented lens), a meniscus lens L3 that has a concave surface facing the object side, and a biconvex lens L4. The cemented lens CL1 includes a plano-convex lens L1 that is arranged closest to the object side and has a flat surface facing the object side, and a meniscus lens L2 (first meniscus lens) that is arranged at the position closer to image side than the plano-convex lens L1 and has a concave surface facing the object side. The meniscus lens L3 is a positive lens.

The second lens group G2 includes a plurality of cemented lenses (a cemented lens CL2 and a cemented lens CL3). Specifically, the second lens group G2 includes, in order from the object side, the cemented lens CL2, the cemented lens CL3, and a biconvex lens L11.

The cemented lens CL2 is a first achromatic lens component that includes three-piece cemented lens composed of positive lens, negative lens, and positive lens included in this order. The cemented lens CL2 includes a biconvex lens L5, a meniscus lens L6 that has a concave surface facing the object side, and a meniscus lens L7 that has a concave surface facing the object side.

The cemented lens CL3 is a second achromatic lens component that includes three-piece cemented lens composed of negative lens, positive lens, and negative lens included in this order. The cemented lens CL3 includes a meniscus lens L8 that has a concave surface facing the image side, a biconvex lens L9, and a meniscus lens L10 that has a concave surface facing the object side. The cemented lens CL3 is arranged near the cemented lens CL2, specifically, at a position in which the distance on an optical axis between a lens surface s14 that is a lens surface of the cemented lens CL2 and a lens surface s15 that is a lens surface of the cemented lens CL3 is less than the thickness of the cemented lens CL3 on the optical axis. The lens surface s14 is situated closest to the image side among the lens surfaces of the cemented lens CL2. The lens surface s15 is situated closest to the object side among the lens surfaces of the cemented lens CL3.

The third lens group G3 includes, in order from the object side, a cemented lens CL4 (second cemented lens) that has a concave surface facing the image side, and a cemented lens CL5 that has a concave surface facing the object side. The cemented lens CL4 has a meniscus shape that has a concave surface facing the image side, and includes, in order from the object side, a biconvex lens L12 that is a positive lens and a biconcave lens L13 that is a negative lens. The cemented lens CL5 includes a meniscus lens L14 that has a concave surface facing the object side and a meniscus lens L15 that has a concave surface facing the object side.

In the objective 3, the meniscus lens L6, the meniscus lens L8, and the meniscus lens L10 satisfy Conditional Expression (6). In other words, each of the meniscus lens L6, the meniscus lens L8, and the meniscus lens L10 is a first negative lens of the objective 3.

The following is lens data of the objective 3.

| Objective 3 | | | | |
|---|---|---|---|---|
| s | r | d | nd | vd |
| 1 | INF | 0 | | |
| 2 | INF | 0.17 | 1.52397 | 54.41 |
| 3 | INF | 0.144 | 1.51495 | 41 |
| 4 | INF | 0.667 | 1.51633 | 64.14 |
| 5 | −2.8462 | 3.705 | 1.883 | 40.76 |
| 6 | −3.2561 | 0.1 | | |
| 7 | −10 | 0.924 | 1.883 | 40.76 |
| 8 | −8.8357 | 0.15 | | |
| 9 | 49.7862 | 1.2 | 1.883 | 40.76 |
| 10 | −132.2999 | 0.15 | | |
| 11 | 16.1699 | 6.797 | 1.43875 | 94.93 |
| 12 | −8.042 | 0.474 | 1.738 | 32.26 |
| 13 | −30.4208 | 3.517 | 1.43875 | 94.93 |
| 14 | −10.5162 | 0.366 | | |
| 15 | 36.573 | 0.502 | 1.63775 | 42.41 |
| 16 | 11.4502 | 7.533 | 1.43875 | 94.93 |
| 17 | −8.6066 | 0.485 | 1.63775 | 42.41 |
| 18 | −27.1528 | 0.249 | | |
| 19 | 10.3799 | 5.468 | 1.43875 | 94.93 |
| 20 | −35.9049 | 0.15 | | |
| 21 | 7.0141 | 5.038 | 1.43875 | 94.93 |
| 22 | −10.4018 | 0.57 | 1.63775 | 42.41 |
| 23 | 4.175 | 4.018 | | |
| 24 | −3.1086 | 4.346 | 1.7725 | 49.6 |
| 25 | −9.9919 | 2.737 | 1.7847 | 26.29 |
| 26 | −7.1561 | | | |

Surfaces represented by surface numbers s4 and s26 are a lens surface of the objective 3 that is situated closest to the object side and a lens surface of the objective 3 that is situated closest to the image side, respectively.

The following is various data of the objective 3.

$\beta = 60$, FN=22, WD=0.144 mm, H=8.009 mm, f=3 mm $NA_{ob} = 1.5$, L=2.336 mm, $f_1 = 4.7086$ mm, $n_1 = 1.833$, $f_p = 45$ mm, $f_{G1} = 4.04$ mm, $f_{G2} = 14.3$ mm, $f_{G3} = -13.82$ mm When the meniscus lens L6 is the first negative lens, d and $h_1$ are as follows.
d=0.474 mm, $h_1$=16.61 mm
When the meniscus lens L8 is the first negative lens, d and $h_1$ are as follows.
d=0.502 mm, $h_1$=15.818 mm
When the meniscus lens L10 is the first negative lens, d and $h_1$ are as follows.
d=0.485 mm, $h_1$=16.24 mm
The objective 3 satisfies Conditional Expression (1) to Conditional Expression (6) as described below.

$$(H/f) \times NA_{ob} = 4.0045 \tag{1}$$

$$((H-L)/f) \times NA_{ob} = 2.8365 \tag{2}$$

$$(f_1/f) \times NA_{ob} = 1.046355556 \tag{3}$$

$$n_1 = 1.833 \tag{4}$$

$$f_p/f = 15 \tag{5}$$

$$d/h_1 = 0.02854 \text{ (in the case of the meniscus lens } L6) \tag{6}$$

$$d/h_1 = 0.03174 \text{ (in the case of the meniscus lens } L8) \tag{6}$$

$$d/h_1 = 0.02986 \text{ (in the case of the meniscus lens } L10) \tag{6}$$

Figure 7A:
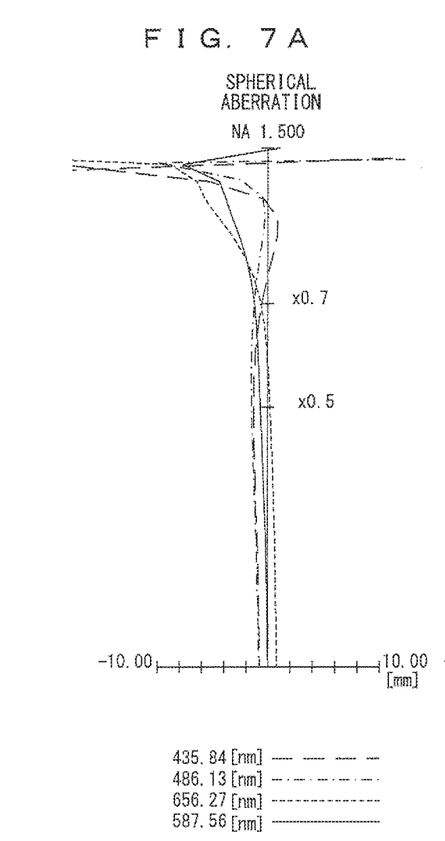
FIGS. 7A to 7D are diagrams of an aberration in an optical system that includes the objective 3 and the tube lens 10.
Figure 7B:
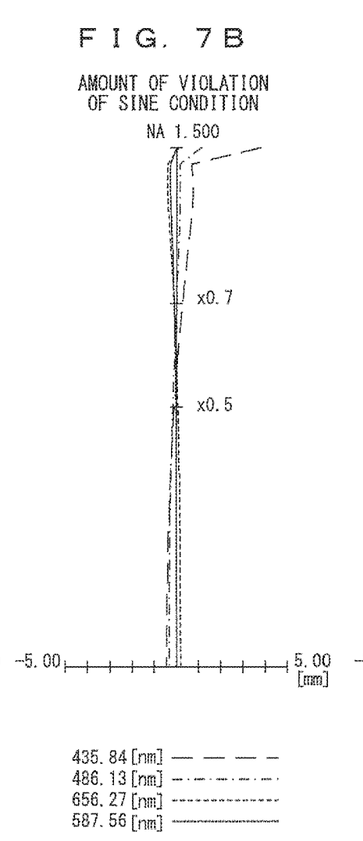
Figures 7C, 7D:
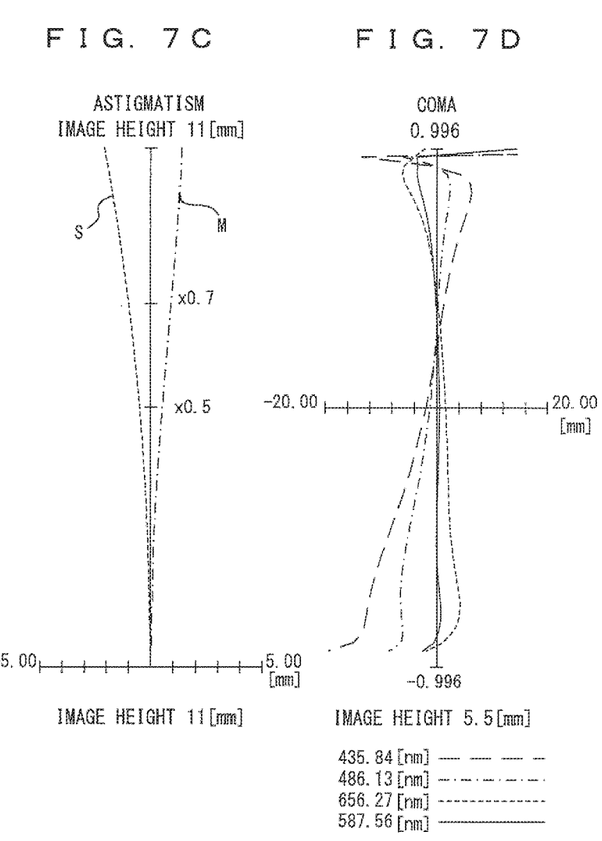

FIGS. 7A to 7D are diagrams of an aberration in an optical system that includes the objective 3 and the tube lens 10. These diagrams illustrate aberrations in an image plane formed by the objective 3 and the tube lens 10. The tube lens 10 is arranged such that the distance on an optical axis between the lens surface s26 that is a lens surface of the objective 3 and the lens surface s1 that is a lens surface of the tube lens 10 is 133 mm. The lens surface s26 is situated closest to the image side among lens surfaces of the objective 3. The lens surface s1 is situated closest to the object side among lens surfaces of the tube lens 10. FIG. 7A is a spherical aberration diagram, FIG. 7B illustrates an amount of violation of the sine condition, FIG. 7C is an astigmatism diagram, and FIG. 7D is a coma diagram. As illustrated in FIGS. 7A to 7D, the aberrations are corrected well in a wide field in the present embodiment.

What is claimed is:

1. An immersion objective comprising, in order from an object side:
    a first lens group that has a positive refractive power;
    a second lens group that has a positive refractive power; and
    a third lens group that has a negative refractive power, wherein
    the immersion objective has a numerical aperture of 1.42 or higher on the object side,
    the first lens group includes a first cemented lens that includes a plano-convex lens and a first meniscus lens that has a concave surface facing the object side, and at least one positive lens,
    the second lens group includes a plurality of cemented lenses,
    the third lens group includes, in order from the object side, a second cemented lens that has a concave surface facing an image side and includes a positive lens and a negative lens, a negative lens that has a concave surface facing the object side, and a positive lens, and
    a conditional expression below $$3.5 \leq (H/f) \times NA_{ob} \leq 5.2 \tag{1}$$

is satisfied when H is a maximum value of a height of an axial marginal ray in the immersion objective, f is a focal length of the immersion objective, and $NA_{ob}$ is a numerical aperture of the immersion objective.

2. The immersion objective according to claim 1, wherein a conditional expression below $$1.8 \leq ((H-L)/f) \times NA_{ob} \leq 3.2 \tag{2}$$

is satisfied when L is a minimum value of a height of an axial marginal ray in the third lens group.

3. The immersion objective according to claim 2, wherein a conditional expression below $$1 \leq (f_1/f) \times NA_{ob} \leq 1.4 \tag{3}$$

is satisfied when $f_1$ is a focal length of the first cemented lens.

4. The immersion objective according to claim 3, wherein a conditional expression below $$1.75 \leq n_1 \leq 1.9 \tag{4}$$

is satisfied when $n_1$ is a refractive index of the first meniscus lens.

5. The immersion objective according to claim 3, wherein a conditional expression below $$9 \leq f_p/f \leq 17 \tag{5}$$

is satisfied when $f_p$ is a parfocalizing distance of the immersion objective.

6. The immersion objective according to claim 3, wherein the immersion objective includes a first negative lens, and a conditional expression below $$0.005 \leq d/h_1 \leq 0.1 \tag{6}$$

is satisfied when d is a thickness of the first negative lens on an optical axis, and $h_1$ is a height of an axial marginal ray on a lens surface on the object side of the first negative lens.

7. The immersion objective according to claim 4, wherein a conditional expression below $$9 \leq f_p/f \leq 17 \tag{5}$$

is satisfied when $f_p$ is a parfocalizing distance of the immersion objective.

8. The immersion objective according to claim 2, wherein a conditional expression below $$1.75 \leq n_1 \leq 1.9 \tag{4}$$

is satisfied when $n_1$ is a refractive index of the first meniscus lens.

9. The immersion objective according to claim 8, wherein a conditional expression below $$9 \leq f_p/f \leq 17 \tag{5}$$

is satisfied when $f_p$ is a parfocalizing distance of the immersion objective.

10. The immersion objective according to claim 2, wherein a conditional expression below $$9 \leq f_p/f \leq 17 \tag{5}$$

is satisfied when $f_p$ is a parfocalizing distance of the immersion objective.

11. The immersion objective according to claim 2, wherein the immersion objective includes a first negative lens, and a conditional expression below $$0.005 \leq d/h_1 \leq 0.1 \tag{6}$$

is satisfied when d is a thickness of the first negative lens on an optical axis, and $h_1$ is a height of an axial marginal ray on a lens surface on the object side of the first negative lens.

12. The immersion objective according to claim 1, wherein
a conditional expression below $$1 \le (f_1/f) \times NA_{ob} \le 1.4 \quad (3)$$

is satisfied when $f_1$ is a focal length of the first cemented lens.

13. The immersion objective according to claim 12, wherein
a conditional expression below $$1.75 \le n_1 \le 1.9 \quad (4)$$

is satisfied when $n_1$ is a refractive index of the first meniscus lens.

14. The immersion objective according to claim 12, wherein
a conditional expression below $$9 \le f_p/f \le 17 \quad (5)$$

is satisfied when $f_p$ is a parfocalizing distance of the immersion objective.

15. The immersion objective according to claim 12, wherein
the immersion objective includes a first negative lens, and a conditional expression below $$0.005 \le d/h_1 \le 0.1 \quad (6)$$

is satisfied when d is a thickness of the first negative lens on an optical axis, and $h_1$ is a height of an axial marginal ray on a lens surface on the object side of the first negative lens.

16. The immersion objective according to claim 13, wherein
a conditional expression below $$9 \le f_p/f \le 17 \quad (5)$$

is satisfied when $f_p$ is a parfocalizing distance of the immersion objective.

17. The immersion objective according to claim 1, wherein
a conditional expression below $$1.75 \le n_1 \le 1.9 \quad (4)$$

is satisfied when $n_1$ is a refractive index of the first meniscus lens.

18. The immersion objective according to claim 17, wherein
a conditional expression below $$9 \le f_p/f \le 17 \quad (5)$$

is satisfied when $f_p$ is a parfocalizing distance of the immersion objective.

19. The immersion objective according to claim 1, wherein
a conditional expression below $$9 \le f_p/f \le 17 \quad (5)$$

is satisfied when $f_p$ is a parfocalizing distance of the immersion objective.

20. The immersion objective according to claim 1, wherein
the immersion objective includes a first negative lens, and a conditional expression below $$0.005 \le d/h_1 \le 0.1 \quad (6)$$

is satisfied when d is a thickness of the first negative lens on an optical axis, and $h_1$ is a height of an axial marginal ray on a lens surface on the object side of the first negative lens.

* * * * *